May 17, 1938.　　B. SCHLANGER ET AL　　2,117,857
SCREEN AND SYNCHRONIZED LIGHT FIELD
Filed May 17, 1937　　4 Sheets-Sheet 1
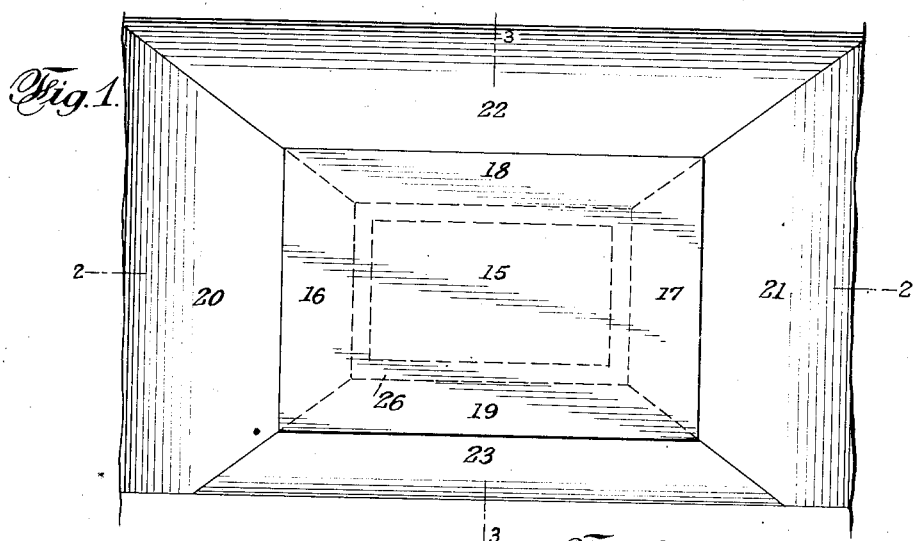
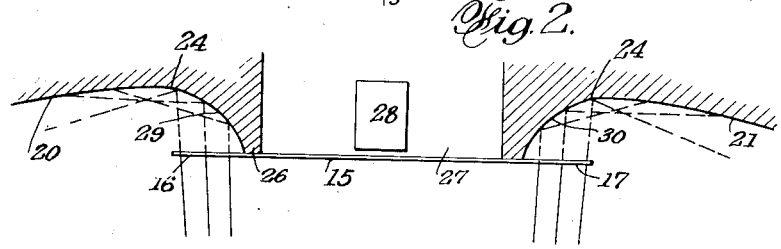
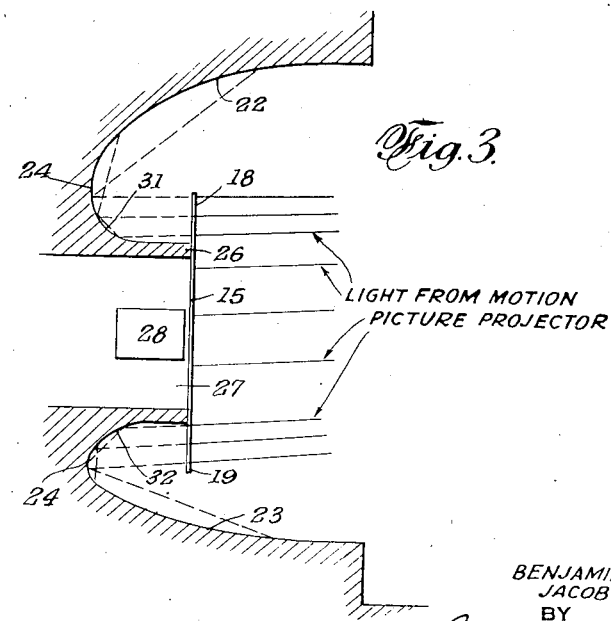
INVENTORS
BENJAMIN SCHLANGER
JACOB GILSTON
BY
ATTORNEY

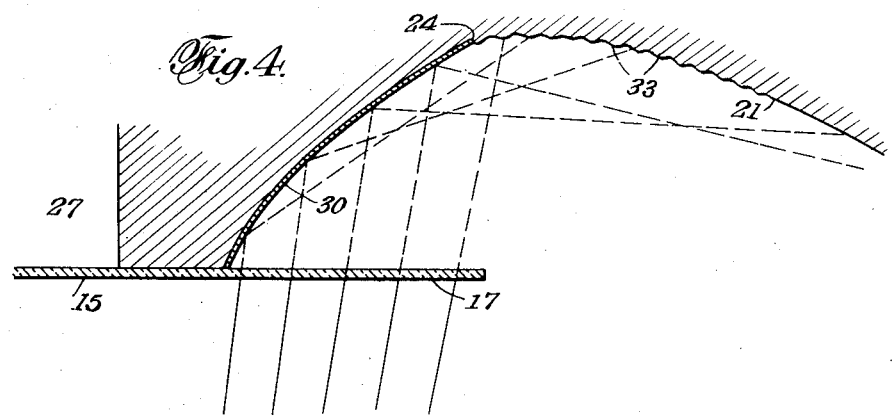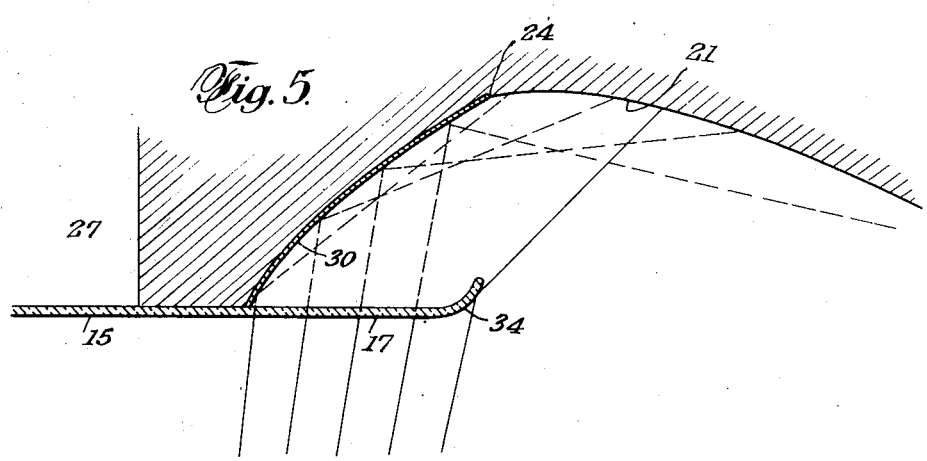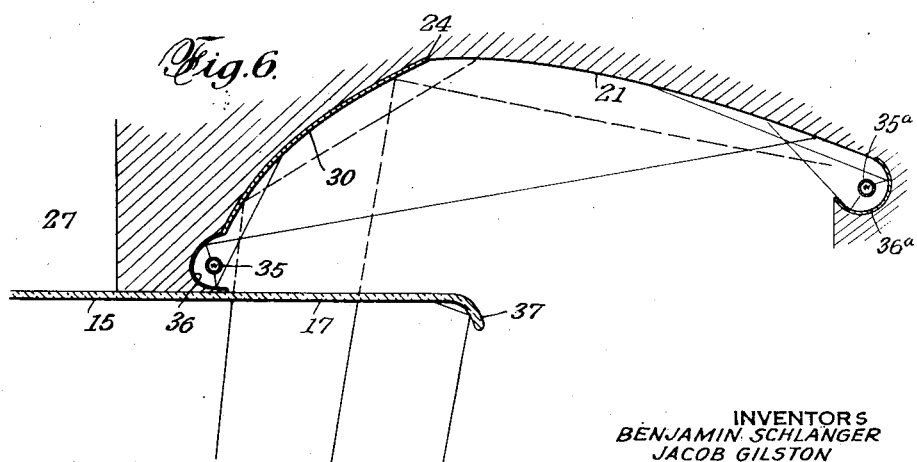

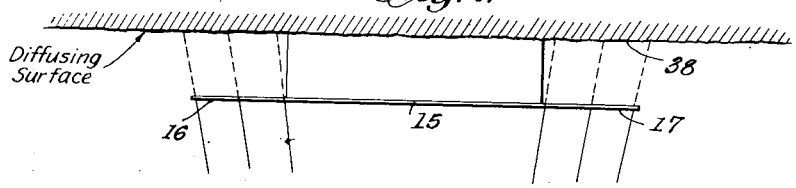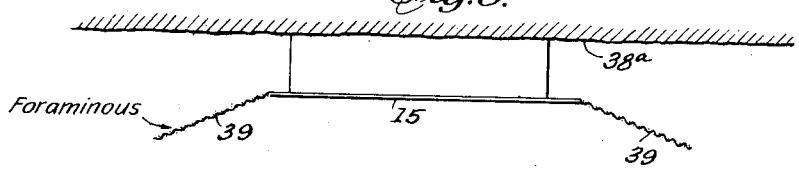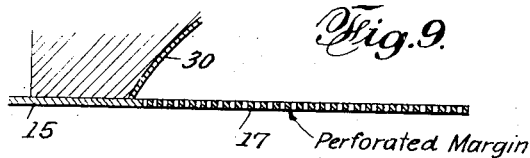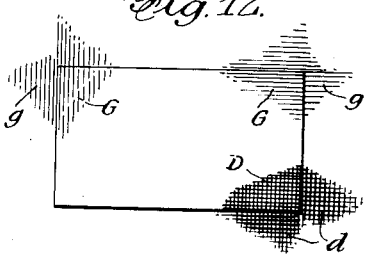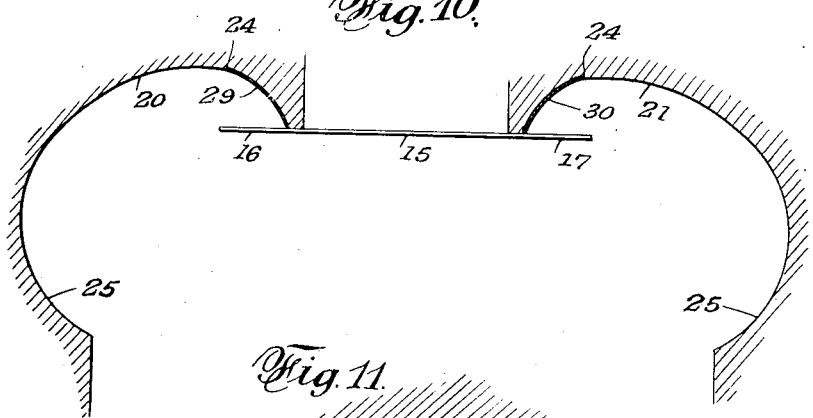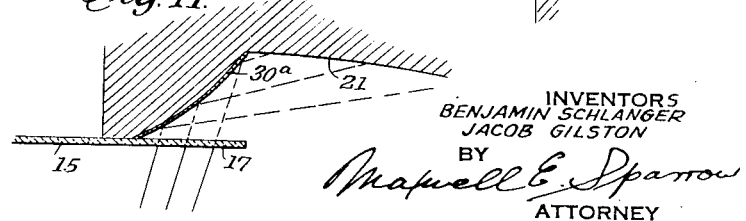

May 17, 1938.   B. SCHLANGER ET AL   2,117,857
SCREEN AND SYNCHRONIZED LIGHT FIELD
Filed May 17, 1937   4 Sheets-Sheet 4

INVENTORS
BENJAMIN SCHLANGER
JACOB GILSTON
BY
ATTORNEY

Patented May 17, 1938

2,117,857

UNITED STATES PATENT OFFICE 2,117,857

SCREEN AND SYNCHRONIZED LIGHT FIELD

Benjamin Schlanger and Jacob Gilston,
New York, N. Y.

Application May 17, 1937, Serial No. 143,110

9 Claims. (Cl. 88—24)

This invention relates to synchronized light field and seeks to provide (among other things) a screen and background for enhancing the appearance of a picture projected thereon. It has particular reference to motion picture screens.

Particularly in motion picture theatres, the screen comprises a light area provided with a dark border. Thus the projected picture is framed by said border and this results in a sharp contrast between the light reflected from the light area and the lack of light from the dark border. This sharp contrast is often the cause of eye strain and fatigue to the observer. These complaints become more frequent when color pictures are shown, and in addition, the dark border forms an unnatural setting which spoils the desired effect of the picture.

When it is borne in mind that the scenes as originally filmed are not framed in a border, it is apparent that the ideal projection of the scene upon a screen would have the edges of the scene seem to fade off into the surrounding background somewhat in the manner of a vignette.

The present invention, therefore seeks to obviate the above mentioned faults and to provide a combined screen and preferably diffusive background field which will provide the desired effects.

According to this invention the field illumination surrounding the screen in its various parts is at all times of an intensity and color very nearly matching the intensity and color of any part of the screen margin thereby providing a border or field illumination which synchronizes both as to intensity and color with the intensity and color of the marginal areas of the screen. The field of illumination surrounding the screen has an intensity and color that tends to match the intensity and color of the marginal areas and not the intensity and color of the central portion of the screen.

This reproducing of the marginal intensity and color rather than the central area intensity and color assures that there will always be a blending of the edges of the screen intensity and color with the contiguous field area, the total result being that of a synchronous field and screen marginal intensity and color.

It is an object of the present invention to provide for varying the intensity of light and/or hue of color on the field contiguous to the screen margin to correspond with the variations in the brightness on the screen margin.

A further object of the invention is to provide a screen having translucent areas or the like positioned in such relation to a background as to provide said background adjacent the edges of the screen, with an illumination comparable in brightness with the illumination of the screen.

Another object of the invention is to provide means for reflecting the projection light rays projected over the surface of the projection screen, which passes through the translucent portions of said screen, to the background in such a manner as to illuminate the background more intensely immediately adjacent the screen, said illumination gradually fading into the surrounding background.

The invention also contemplates the use of auxiliary lighting means for the background which may serve to increase the illumination afforded through the translucent areas, or may be used in association with an opaque screen to provide all the illumination for the background.

The invention further contemplates forming the edges of the screen in such a manner as to visually blend said screen edges into the background and simultaneously employing light reflected by said edges for further illuminating the background.

Another contemplated feature of the invention resides in forming the background surface as a diffusing area, either by providing promiscuous irregularities in said surface or by corrugating, waving, or otherwise forming said surface other than smooth.

Another contemplated feature resides in the provision of a foraminous border around the screen or a foraminous curtain cooperating with the screen, said border or curtain serving to soften the illumination on the background and make inconspicuous the edges of the screen.

The above and many other features of the invention are realized in the several forms of the invention as illustrated in the accompanying drawings which, together with the following specification, fully disclose the invention as at present conceived.

In the drawings:—

Fig. 1 is a front view of a combined screen and background in a preferred form of embodiment.

Fig. 2 is a horizontal sectional view on the line 2—2 of Figure 1.

Fig. 3 is a vertical sectional view on the line 3—3 of Figure 1.

Fig. 4 is an enlarged fragmentary sectional view of an alternate form of the invention.

Figs. 5 and 6 are similar views of still other forms.

Figs. 7 and 8 are plan sectional views of further modified forms of the invention.

Fig. 9 is a detail sectional view of a modified form of screen.

Fig. 10 is a plan sectional view similar to Figure 2 of a modified form of background.

Fig. 11 is a fragmentary cross sectional view of an alternate form of structure.

Fig. 12 is a semi-diagrammatic front view illustrating the principles of the invention.

Figure 13:
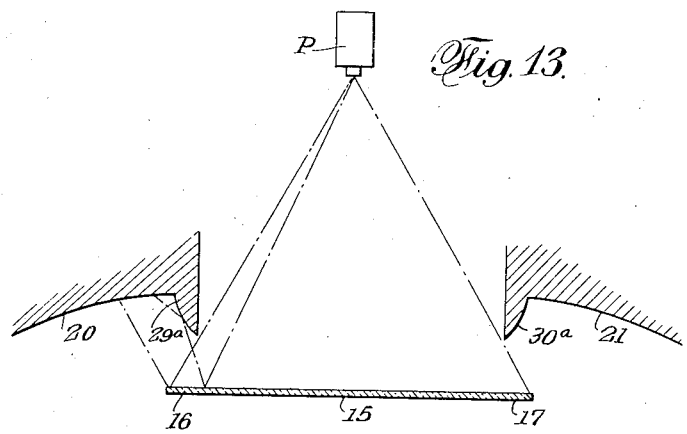
Figure 14:
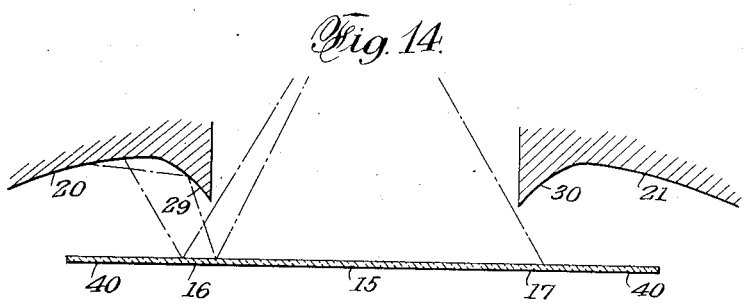
Figure 15:
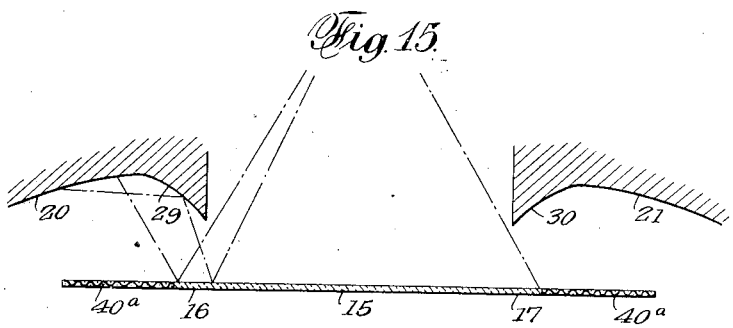

Figs. 13, 14, and 15 are diagrammatic cross-sectional views of the invention as applied to a rear projection screen.

Referring to the drawings in greater detail, Figures 1, 2 and 3 illustrate a preferred arrangement wherein the screen 15 is provided with marginal portions 16, 17, 18, and 19 which may be of the same or varying widths, as desired. In the present instance the screen, or at least its marginal portions, is preferably made of a translucent material so that projected light rays may, in part, pass through said translucent portions. While translucent marginal areas are at present preferred, it is apparent that these areas may be perforated as shown in Figure 9, or may be otherwise formed so that their surfaces may serve to display a projected picture and simultaneously permit the passage of a portion of the light therethrough.

A preferably diffusive background is provided in spaced relation with the screen and in the presented form comprises the fields 20, 21, 22, and 23 respectively associated with the marginal areas 16, 17, 18, and 19. It will be noted that each of these fields starts at a line 24. This line, in effect, when continued on all the background fields may form a square substantially the size of the screen.

The fields, from the line 24, may each be formed as slightly curved or substantially straight walls such as shown in Figure 2, or may be considerably curved as shown in Figures 3 and 10. In the latter instance, these field walls may be reentrantly curved as shown at 25.

The marginal areas of the screen may be defined at the rear by a frame 26 which borders an opening 27 in which may be placed sound producing mechanism such as shown at 28. Between said frame and the line 24 forming the inner edges of the fields there are preferably provided reflectors 29, 30, 31, and 32, respectively formed as continuation of the fields 20, 21, 22, and 23. Thus it can be seen that each marginal area of the screen is provided with a reflector at the rear thereof which is adapted to reflect light passing through said marginal areas to the fields with which they are associated. These reflectors may be concave as shown in Figures 2, 3, 4, 5, 6, and 10 or convex as shown at 30ᵃ of Figure 11, or any desirable shape.

As seen from any of the Figures 2, 3, 4, 5, 6, or 10, the light thus received by the reflectors is projected to the fields with greatest intensity at near portions of the fields, said intensity gradually diminishing at further portions of said fields.

The illumination thus provided for the fields serves to obscure the marginal edges of the screen which are now framed in a light background. For this reason the observer is given the effect of an illuminated area which gradually fades into a dark field.

As an example of the result obtained, let us assume that only white light is projected on the screen, some of said light will pass through the translucent margins to the reflectors to be reflected on to the background field. There is thus provided a halo having a light intensity somewhat less but approaching the illumination on the screen. It is apparent, therefore, that the screen edge tends to become invisible to the observer.

Now, in the case of a black and white projected picture, those portions of the margin which receive white light will pass that light to the reflectors and hence to the fields, and those which receive less light from gray parts of the film will pass part of said gray light. Thus, the particular quality of light which is received by the screen margin is transmitted to the associated field portions. This is clearly illustrated in Figure 12 wherein the quite dark portion "D" on the screen is associated with the similarly colored portion "d" on the background and the gray portions "G" on the screen are associated with the substantially similar colored portions "g" on the background. It is apparent therefrom that the screen margins and the associated field will have somewhat the same appearance to the observer and therefore the screen edge seems to lose definition.

As shown in Figure 4, the fields may be provided with corrugations or waves 33 which act to diffuse the reflected light so that contiguous light and dark portions thereof, blend into each other. These corrugations are particularly efficacious in blending two differently colored field portions when color film is being projected on the screen.

Another feature which may be incorporated is shown in Figure 5 wherein the edges of the screen are curved back as at 34. Since most of the light which these edges receive is reflected to the background as shown, they present to the observer a less illuminated screen border which appears to fuse smoothly into the background. In this instance also, the light so reflected serves to intensify the illumination of said background.

In the form of the invention shown in Figure 6, auxiliary light means such as the light source 35 may be positioned immediately back of the screen and provided with reflecting means 36 for illuminating the fields. This light source may be employed together with the light passing through the screen margins to illuminate the fields to the intensity desired. Also, the quality of illumination of the fields may be varied by varying the type and intensity of light provided from this source. Since color is known to affect the moods of the observer, it is readily seen that these lights 35, may be colored in keeping with the mood of the projected picture and selectively employed for this purpose.

Another manner of obtaining an edging for correcting inaccurate picture centering on the screen is also shown in Fig. 6. In this case the screen rim is forwardly directed as at 37 so it also does not reflect back to the observer the projected light but reflects this light to adjacent portions of the screen and in this manner the screen rim appears vague and without definition.

In some instances it may be desired to extend the forwardly directed edges 37 so that they overstand the field which is in this manner viewable therethrough. Because of the diffusing properties of the surface of the screen 15, these enlarged angulated rim portions 37 will receive from the screen light of a quality commensurate with the screen illumination, and inasmuch as these rim portions are substantially transparent, or at least translucent to a high degree, the background field illumination is also seen by the observer through said portions. It is apparent from the above, that the illumination these rim portions receive from the screen combined with the illumination of the fields seen through them provide the effect desired as contemplated in this invention.

While the form of the invention shown in Fig. 7 will not provide the efficiency of those forms previously described, an approach to the results desired may be had by forming the background with a promiscuously stippled diffusing surface 38. This surface will serve to diffuse the light passing through the screen margins to provide a halo on the background which serves to minimize the definition of the screen edges.

This effect may also be somewhat similarly produced by arranging a foraminous curtain 39 around the screen as shown in Fig. 8. Thus the illumination on the background 38ª as seen through the border 39, appears variably intense according to the position of the observer in the theatre.

The invention also may be employed where rear projection is used. As shown in the forms of the invention illustrated in Figs. 13, 14, and 15, the projector P is arranged at the rear of the screen 15 which is transparent so the projected picture thereon may be viewed from the front. In this connection, the marginal portions 16 and 17 of the screen, receive light from the projector which is deflected thereby to the reflectors 29 and 30 (Figs. 14 and 15) or reflectors 29ª and 30ª (Fig. 13). These reflectors in turn direct this light to the fields 20 and 21 associated therewith. In addition, some of the light deflected from the marginal portions 16 and 17, is sent directly to the fields and since the screen is provided with diffusing properties, this light will be diffused over the field surface. In this manner the important objects of the invention are attained in connection with rear projection apparatus.

As shown in Fig. 14, the screen may be formed with outer rim portions 40 through which the fields are viewable since these portions are transparent. Thus, the projected picture and the synchronized illumination of the fields are all seen by the observer on the surface of the screen.

The illustration of the invention in Fig. 15 is similar to that shown in Fig. 14, but in this instance, foraminous rim portions 40ª are employed so the field may be seen therethrough.

From the foregoing several forms of the invention, as at present conceived, it may be seen that each seeks to blend the screen into the background so that the edges of the picture projected thereon are without definition but appear to blend into the background providing the effect herein desired. Since skilled persons may practice the invention in manners not above described, the prior pertinent art rather than the instant disclosure should form the basis of interpretation of the invention as claimed. While the invention is shown as being particularly applied to screens of motion picture theatres, it may be used in other ways to obtain the contemplated results, amongst which may be mentioned application to studios, television, advertising, small screens for home use and etc.

In giving scope to the invention it is understood that the background may assume any desired form and shape and any surface treatment may be applied or employed to render the same suitable for the purpose intended.

Furthermore, if it is found desirable the surface may be treated with or comprise any reflecting or diffusing material, or combination of materials. Again, the relative extent of the reflecting and diffusion surfaces may vary and need not be relatively co-extensive. The surface, character or nature of the field may be similar or dissimilar from that of the reflector.

It is understood that the device shown in Fig. 4, for example, may be provided with an outer rim portion similar to 40 of Fig. 14 and forming an extension of the marginal portion 17 of Fig. 4. This extension 40 may be made of a highly translucent material of an optical nature.

Fig. 6 shows that a light source 35ª surrounded by an arcuate reflector 36ª may be employed. This condition may be utilized in connection with any of the disclosures shown in the drawings if found desirable.

Having thus described our invention, what we claim as new and desire to secure by Letters Patent, is:—

1. In combination, a projection screen adapted to have the projection light rays projected over the surface thereof, said screen having at least the marginal portions thereof light transmitting and reflecting relative to the projection light rays, and a diffusively reflecting background spaced behind said marginal portions of the screen and extending laterally outside of the marginal edges of said screen, whereby to form an illuminated field substantially around the screen.

2. In combination, a projection screen adapted to have the projection light rays projected over the surface thereof, said screen having at least the marginal portions thereof light transmitting and reflecting relative to the projection light rays, and diffusively reflecting means spaced behind said marginal portions of the screen and extending laterally outside of the marginal edges thereof, whereby to form an illuminated field substantially around the screen from light rays projected onto the screen and located outside of the area of said light rays.

3. In combination, a projection screen adapted to have the projection light rays projected over the surface thereof, said screen having at least the marginal portions thereof light transmitting and reflecting relative to the projection light rays, and a background of light diffusing and reflecting means spaced at the rear of said marginal portions and located in the path of transmitted light of projected light rays on said screen in position to direct said transmitted light laterally outside of said path, whereby a field illumination contiguously surrounding said screen is of an intensity substantially varying with the light intensity of the screen margins.

4. In combination, a projection screen adapted to receive the projection light rays, said screen having marginal portions thereof light transmitting and reflecting in the area of the projection light rays, and a diffusively reflecting background arranged behind said marginal portions of the screen in position to direct transmitted portions of the projection light laterally outside of the marginal edges of the projection light rays, whereby the field illumination contiguously surrounding said screen is of an intensity substantially varying with the light intensity of the screen margins.

5. In combination, a projection screen adapted to receive the projection light rays, said screen having marginal areas thereof light transmitting and reflecting in the area of the projection light rays, and a light diffusing and reflecting background surface arranged behind said marginal areas of the screen, whereby a field illumination around the projection area is provided substantially synchronizing with the illumination on the screen marginal areas.

6. In combination, a projection screen adapted to receive the projection light rays, said screen having marginal portions thereof light transmitting and reflecting in the area of the projection light rays, and a light diffusing and reflecting background surface arranged behind said marginal portions of the screen in the path of the projection light rays in position to direct transmitted portions of the projection light laterally outside of the marginal edges of the screen, whereby the field illumination contiguously surrounding said screen is of an intensity substantially varying with the light intensity of the screen margins.

7. In combination, a projection screen adapted to have the projection light rays projected over the surface thereof, said screen having at least the marginal portions thereof light transmitting and reflecting relative to the projection light rays, and an arcuate background of light diffusing and reflecting means spaced at the rear of said marginal portions and located in the path of transmitted light of the projection light rays on said screen in position to direct said transmitted light laterally outside of said path, whereby a field illumination is formed substantially around the screen.

8. In combination, a projection screen adapted to receive the projection light rays, said screen having marginal areas thereof light transmitting and reflecting in the area of the projection light rays, and a light diffusing and reflecting background surface arranged behind said marginal areas of the screen, whereby a field illumination around the projection area is provided substantially synchronizing in intensity with the intensity of the screen marginal areas, said screen having a forwardly turned substantially angular rim at the edges thereof in position to receive reflected light from the screen and to limit the field of the projection light rays.

9. In combination, a projection screen adapted to receive the projection light rays from the rear thereof, said screen having marginal portions thereof light transmitting and reflecting in the area of the projection light rays, and a diffusively reflecting background arranged behind said marginal portions of the screen in position to direct reflected portions of the projection light laterally outside of the marginal edges of the projection light rays, whereby the field illumination contiguously surrounding said screen is of an intensity substantially varying with the light intensity of the screen margins.

BENJAMIN SCHLANGER.
JACOB GILSTON.